May 8, 1962 M. GARBUNY 3,034,010
RADIATION DETECTION
Filed May 22, 1957 2 Sheets-Sheet 1

INVENTOR.
MAX GARBUNY

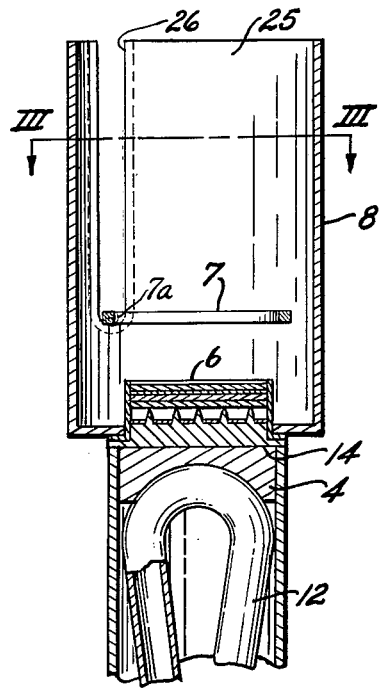
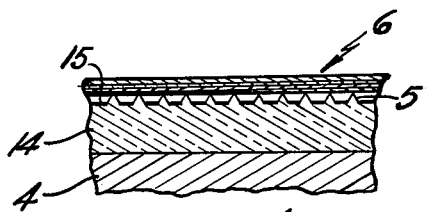
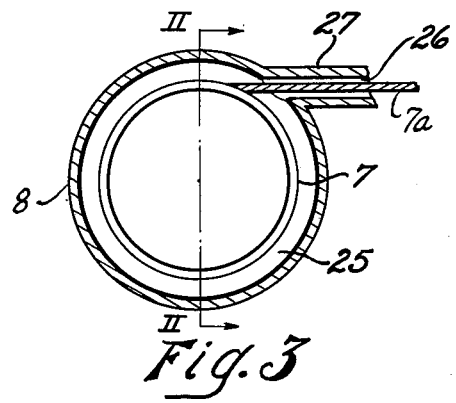
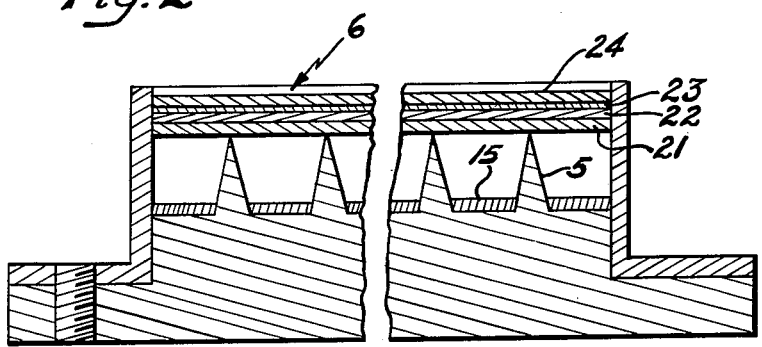
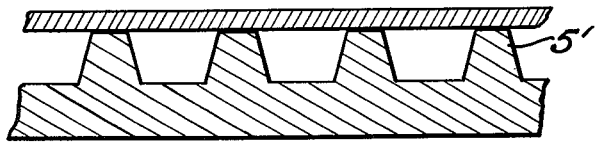

United States Patent Office 3,034,010
Patented May 8, 1962

3,034,010
RADIATION DETECTION
Max Garbuny, Pittsburgh, Pa., assignor, by mesne assignments, to the United States of America as represented by the Secretary of the Air Force
Filed May 22, 1957, Ser. No. 660,988
4 Claims. (Cl. 313—101)

This invention relates to radiation detection, and particularly to thermal image conversion.

An object of the invention is the provision of a photothermionic image converter tube having a screen which is exceptionally sensitive to infrared radiations. The term photothermionic as used herein refers to characteristics involving both photo and thermionic emission.

Another object is the provision of an image responsive screen wherein heat conduction therefrom is minimized.

A further object is the provision of an image converter tube having an image responsive screen wherein radiation is the primary heat dissipating factor with convection and conduction being reduced to a minimum.

Another object is the provision of an image converter tube utilizing a controlled temperature condition for increasing operating sensitivity to radiation.

A still further object is the provision of an image converter tube which minimizes interference due to stray radiations.

Another object is the provision of an image converter tube having an emission energy-collecting electrode positioned on the same side of the sensitive screen as is the infrared energy source, to receive the emission energy by reflection back from the same sensitive surface upon which the infrared rays impinge. By this arrangement there is eliminated any need for filtration of the rays through solid material before reaching the emitting surface.

A further object is the provision of an image converter tube having a screen with a physical configuration lending itself to increased sensitivity to thermal radiation.

These objects, features and advantages, are achieved generally by providing an infrared radiation image in a receiving tube comprising an evacuated envelope having a window for transmitting infrared radiation onto the surface of a photothermionic screen mounted on a support inside the envelope.

It is well known that there are various means for detecting radiant heat energy and also means for producing a visible image of the heat-radiating body. This invention, however, is concerned with improvements which obtain the optimal conditions of operation and design which a sensitive surface should in general fulfill if its temperature distribution is the basis of the image conversion process.

The temperature fluctuations and, therefore, the sensitivity of the surface in response to the improved image will be a maximum if the heat carried away from it is a minimum. Heat loss is due to radiation, convection, and conduction. Conduction is by far the largest factor of these for a surface in contact with a known solid at normal or lower temperatures. Hence, by the selection of a supporting material of low thermal conductivity and by suspending the active layer by means of point supports so that the area of support is a small fraction of the total radiating surface, conduction is reduced to a minimum. Convection in an evacuated tube is negligible and hence the heat equilibrium is mainly due to radiation exchange.

Since heat loss is now mainly restricted to radiation, temperature fluctuations and, therefore, sensitivity can be still further increased by reducing the operating temperature of the surface. Also, the specific process of photothermionic imaging becomes substantially more effective as the temperature is lowered. In particular, the response of photoemission of certain semi-conductors to visible of all wave lengths varies sharply with temperature if the latter is held within a certain interval. As an example, the photoemission of cesium-antimony varies by a factor in the order of 100, as the temperature is increased from that of liquid nitrogen to about 30 degrees above this point. These facts make it advantageous to operate the surface not only generally at low temperatures, but within a specified interval thereof.

If heat loss is mainly due to radiation and the surface is maintained at a temperature different from the ambient, it is important to shield the surface from all ambient radiation. This follows from two reasons: first, to arrive at a given low temperature, the surface must be protected from the radiation of warmer parts except for a specified solid angle extended towards the observed object; second, to avoid a priori temperature distribution of the unilluminated surface, each of its elements should receive as uniform a background radiation from the apparatus itself as possible.

The sensitive surface must be an extremely thin layer for two reasons: first, the thermal time constant, viz. the period passing until best equilibrium is reached, will be proportional to the layer thickness; second, it is known that the lateral heat conductivity of thin films is substantially smaller than that of the bulk material so that lateral heat diffusion decreases in higher order as the layer thickness is reduced. Thus, requirements of resolution and speed of response make it desirable to keep the film as thin as possible. The sensitive surface is preferably supported by a layer of small heat conductivity material such as silica or silicon monoxide. In addition, a layer of infrared absorbing material may be necessary, such as goldblack. These layers, successively evaporated, must add up to only about $10^{-5}$ cm. in thickness. Finally, it will be advantageous to permit specular reflection of radiation transmitted through the layer so that another chance for absorption is added.

The large photoemission effects at low temperature will permit high sensitivity and resolution both in competition with inherent noise and local "grain" fluctuations in the phosphor and the sensitive surface. This in turn will reduce shrinkage in tube manufacture since less stringent demands on surface uniformity are necessary.

Other objects and features of this invention will become apparent to those skilled in the art upon careful consideration of the following detailed description, when read in conjunction with the accompanying drawings in which:

FIG. 2 is a view in longitudinal section showing the cooling means for the establishment of low temperatures and a cylindrical radiation shield;

FIG. 3 is a transverse sectional view on line III—III of FIG. 2;

FIG. 4 shows a point supported layer in section as particularly adapted for the purpose of the photothermionic image converter;

FIG. 5 is a view in section, on a larger scale, of a complete layer showing the point supports; and FIG. 6 shows a modification of the parts shown in FIG. 5.

Figure 1:
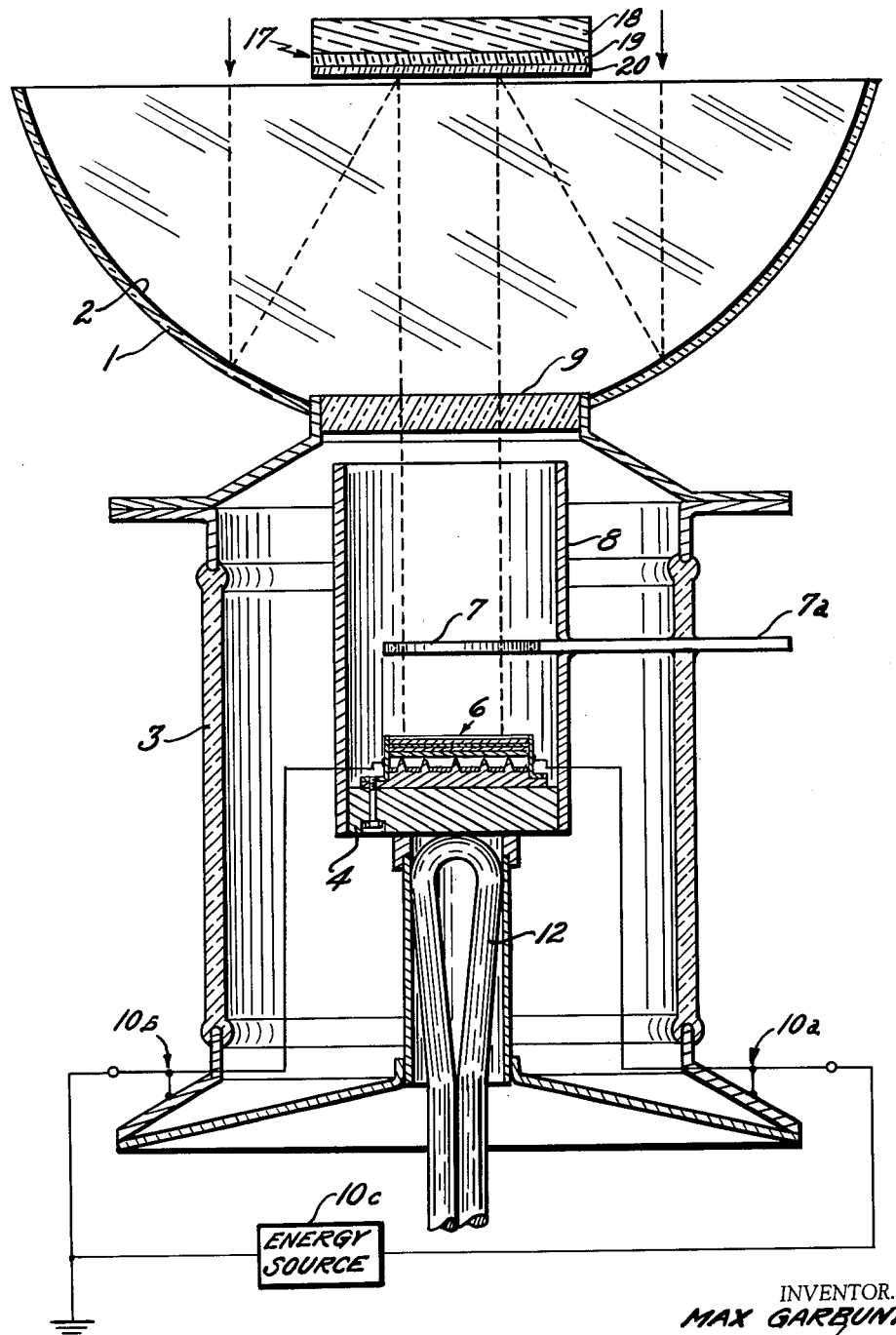
FIG. 1 is a longitudinal sectional view of the complete thermal image converter.

Referring now to the drawings, FIG. 1 represents an embodiment of the invention. The object to be observed or the source of infrared radiation (not shown) would normally be located at a remote point and the infrared radiations from this object are permitted to fall upon a parabolic reflector 1. The thermal image of the observed scene is projected by a mirror system 17 on to the sensitive surface 6. Visible components in this radiation are filtered out, either by an intercepting infrared filter (not shown) or by coating the collecting mirror 1 with an infrared layer 2 through which only infrared radiation can pass. A scanning spot is projected onto the sensitive surface 6 through a semitransparent mirror 20 after passing an optical filter 18 which selects the desired wave length region.

The image tube itself consists of a vacuum tube envelope 3, a hermetically sealed infrared transmitting window 9 such as silver chloride, a cooling means 12 carrying liquid nitrogen or other suitable coolant, a radiation shield 8 of substantially uniform temperature, a point supported multiple-layer cathode assembly 6, an anode or collecting ring 7 having an electrical outlet terminal 7a projecting tangentially from electrode ring 7 and laterally outward through the envelope wall, and cathode-energizing circuit connections 10a and 10b for connecting source 10c to cathode 6 and thereby establishing an electrostatic field adjacent said cathode. The circuit connections 10a and 10b may include adequate resistance units and related parts, as indicated in FIG. 1 of U.S. Patent No. 2,929,868 to H. Leiter, and may be supported on the tube by suitable posts of insulating material as indicated in the drawings. The collector electrode 7 and its terminal 7a may have electrical connection by way of an electronic amplifier and kinescope corresponding to the kinescope 24 illustrated in FIG. 1 of said U.S. Patent No. 2,929,868 to Leiter so that electrons impinging upon this collector electrode 7 will produce a change in the potential of the grid of such kinescope, thereby producing a change in the intensity of the electron beam developed within said kinescope. An auxiliary kinescope corresponding to the device illustrated at 30 in FIG. 1 of the said Leiter patent may be provided on the side of the mirror which is opposite to the side where the photosensitive surface 6 is located. This auxiliary kinescope, as in the Leiter patent, will cast a scanning light spot, and a lens may be provided for the purpose of focusing the image upon the surface 6. A scanning control signal generator corresponding to the signal generator 35 illustrated in FIG. 1 of the said Leiter patent may be provided to supply operating energy to the deflection coils of the auxiliary kinescope and to those of the viewing kinescope as well. In this way the deflection coils of both kinescopes receive their energization from a common signal generator, and the scanning action of both kinescopes is coordinated so that the location of the scanning spot on the screen of the kinescope will correspond to the location of the scanning spot on the screen of the kinescope. An image is therefore produced on the screen of the kinescope, which image will correspond to the image which is being focused upon the sensitive surface 6. Thus the image projecting action may be monitored by observation upon the screen of the kinescope, as in said Leiter patent.

FIG. 4 shows a point supported layer 6 (shown in detail in FIG. 5) as particularly adapted for the purpose of the photothermionic image converter. A multitude of small micro-pyramids or cones 5 corresponding in number to the desired resolution are ruled, pressed or ground into the surface of a suitable material. A preferred method, however, consists in the art of photoforming these pyramids into glass. Photoformed glass is a preferred material because of its low thermal conductivity, and also because it has been found that the supported layers adhere particularly well to it.

A method of supporting a thin layer on top of the small micro-pyramids is as follows: a thin organic film, such as of Zapon, Collodion, or Parlodion, is first mechanically deposited on top of the pyramid surface. A few hundred atom layers of silicon monoxide or silica are then evaporated in vacua onto the organic film, and the latter is subsequently removed by heating the structure at about 375° C. in the presence of air.

A detailed construction of the complete layer 6 is shown in FIG. 5. It consists of a film of silicon monoxide or silica 21, supported by points of glass 5, a layer of goldblack or other absorbing material 22, preferably also a thin layer of electrically conducting material 23, and finally the photoemissive or sensitive surface 24 of e.g. cesium-antimony. A metallic ring may surround the surface to make direct electrical contact with the sensitive surface or, indirect contact may be made by means of the conducting film 23. The entire layer is built up by successive evaporations and has a thickness in the order of $10^{-5}$ cm., each four points supporting a layer element. The area 15 below the pyramid points is preferably allowed to reflect specularly infrared and visible light.

Cooling means for the establishment of low temperatures are shown in FIG. 2. Cooling is provided by coils or loop 12 with the aid of liquefied gases such as nitrogen in thermal contact with the layer support through thermally high conducting block 4 or an intermediate layer of thermally low conducting material 14 may be interposed between the loop and the layer. This thermal resistance may be used to aid, by virtue of a predetermined temperature gradient, in the establishment of the desired thermal operating range.

A cylindrical radiation shield 8 is shown in FIG. 2 in thermal contact with the layer support structure 14. The shield may be of copper or other thermally well conducting material and is of such thickness (e.g. $\frac{1}{16}$") that a negligible temperature gradient is established in operation along the length. The opening 25 of the cylindrical shield may form the iris for the infrared radiation, i.e., radiation is received by the surface either from the observed object or the shield itself. At any rate, the dimensions of the cylindrical shield have to fulfill certain minimum conditions. This is necessary because if the angle of incidence, under which each element of the surface views its object, varies excessively, an a priori biasing of the temperature will result. It is found that a uniformity of better than 1% will be produced in the temperature of the unilluminated, if the shield has a diameter which is twice, and a height which is three times, the diameter of the sensitive surface.

The shield has preferably a cross section shown in FIG. 3 and contains a groove or slot 26 extending vertically along shield 8 (see FIG. 2) to the upper edge thereof, to permit, during tube assembly, placement of an electron collector 7 in proximity of the cathode. The liplike extensions 27 of the shield constitute the boundaries of the groove and prevent ambient radiation to pass the groove.

FIG. 6 shows an alternative design in which instead of point supports for the suspended layer, the support 5' consists of an array of pyramids in which the tops are deliberately stunted to produce just such an amount of heat conducting contact area that the correct temperature interval is established without the use of a cylindrical shield. This "controlled conduction" design relies on great uniformity of the contact areas for each element. Thus the optimal conditions may be all or in part fulfilled. Instead of reaching the desired mean temperature merely by radiation equilibrium, it is possible to allow additional cooling by conducton. In this embodiment the supporting area is not as small as possible, but just large enough to produce, together with radiation exchange, the desired mean temperature and the shield is either not necessary or it can be held at ambient temperature. While conceivable, this embodiment is not preferred because of the inherent difficulty of maintaining the same rate of conduction uniform over the entire surface.

The image tube itself consists of a vacuum tube envelope, or sealed infrared transmitting window such as silver chloride, cooling means carrying e.g. liquid nitrogen, a point supported layer, such as described before, a radiation shield of substantially uniform temperature, a collecting electrode or secondary electron multiplier and electrical outlets for the two or more electrodes.

The rest of the arrangement operates by impressing the signal from the collecting electrode on the intensity grid of a viewing kinescope the beam position of which is synchronized with that of the spot scanning kinescope.

The beneficial effects of the various means suggested in this invention will be more readily understood from a description of the operation. The active layer will effectively absorb the incident thermal radiation, the transmitted part being specularly reflected back through the same absorbing element. By operating the suspended surface at low temperature, the difference in temperature between any two elements can be made to approach that of the corresponding elements of the observed scene. The extreme thinness of the component layer allows for low heat capacity and therefore high picture repetition frequency; furthermore it removes lateral heat diffusion to an extent that the latter is no longer a limitation to picture resolution, and relatively small areas are possible for the pick-up surface. The operation at low temperature permits, in addition, an inherently larger photothermionic effect. This is particularly the case for semi-conductors such as cesium-antimony at certain intervals at low temperature in response to most wave lengths of the visible. This latter effect is especially useful from the point of view of spot scanning; extremely fast and efficient phosphors are available in the blue region. Most important, the larger photothermionic effects at low temperature will permit high sensitivity and resolution both in competition with inherent noise and local "grain" fluctuations in the phosphor and the sensitive surface. This in turn will reduce shrinkage in tube manufacture since less stringent demands on surface uniformity are necessary.

What I claim is:

1. In a radiation detection tube, an envelope having a vacuum chamber and a window for admitting selected frequency radiation to the chamber, a support body within said envelope, said support body having a support area consisting of uniformly dimensioned and uniformly spaced pyramids integrated with and projecting with geometric uniformity from a plane surface on said support body, a thin assembly including a film of photothermionic material above said support area forming a screen for receiving said radiation, and means including a collector electrode for receiving electrons from said screen.

2. A structure as in claim 1 wherein said support area is comprised of a plurality of very small areas in spaced relation to each other.

3. A structure as in claim 1 wherein said support area is comprised of a plurality of very small areas characterized as the pinnacles of substantially pyramidal glass formations.

4. A structure as in claim 1 having additionally a shield in thermally conductive relation to said screen, said shield standing about said screen and having an opening toward said window for admitting said radiation to the screen.

References Cited in the file of this patent

UNITED STATES PATENTS

| | | |
|---|---|---|
| 2,412,822 | Malter | Dec. 17, 1946 |
| 2,522,153 | Andrews | Sept. 12, 1950 |
| 2,541,374 | Morton | Feb. 13, 1951 |
| 2,601,452 | Pensak | June 24, 1952 |
| 2,727,118 | Longini et al. | Dec. 13, 1955 |
| 2,788,452 | Sternglass | Apr. 9, 1957 |
| 2,879,424 | Garbuny et al. | Mar. 24, 1959 |
| 2,929,868 | Leiter | Mar. 22, 1960 |

FOREIGN PATENTS

| | | |
|---|---|---|
| 1,084,262 | France | Jan. 18, 1955 |
| 688,959 | Great Britain | Mar. 18, 1953 |